(12) United States Patent
Maxwell et al.

(10) Patent No.: US 10,912,346 B1
(45) Date of Patent: Feb. 9, 2021

(54) EXOSKELETON BOOT AND LOWER LINK

(71) Applicant: Lockheed Martin Corporation, Bethesda, MD (US)

(72) Inventors: Keith E. Maxwell, Tampa, FL (US); Patricia A. Aelker, Longwood, FL (US); Gavin A. Barnes, St. Cloud, FL (US); Robert O. Brady, Sarasota, FL (US); Erik A. Holmen, Sarasota, FL (US); Jeffreys R. Nichols, Sarasota, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 18 days.

(21) Appl. No.: 15/359,806

(22) Filed: Nov. 23, 2016

Related U.S. Application Data (60) Provisional application No. 62/259,122, filed on Nov. 24, 2015.

(51) Int. Cl.
*A43B 3/00* (2006.01)
*A43C 19/00* (2006.01)
(Continued)

(52) U.S. Cl.
CPC ............. *A43B 3/0005* (2013.01); *A43B 7/14* (2013.01); *A43C 19/00* (2013.01); *B25J 9/0006* (2013.01)

(58) Field of Classification Search
CPC ............................. A43C 19/00; B25J 9/0006
(Continued)

(56) References Cited

U.S. PATENT DOCUMENTS

| 2,010,482 | A | | 8/1935 | Cobb | |
|---|---|---|---|---|---|
| 3,268,927 | A | * | 8/1966 | Markowitz | ............ A63B 31/12 441/63 |

(Continued)

FOREIGN PATENT DOCUMENTS

| JP | H03105191 U | 10/1991 |
|---|---|---|
| JP | 3024978 U | 6/1996 |

(Continued)

OTHER PUBLICATIONS

Artemiadis, Panagiotis K. et al., "EMG-based Position and Force Estimates in Coupled Human-Robot Systems: Towards EMG-controlled Exoskeletons," Experimental Robotics: The Eleventh International Symposium (book), vol. 54, 2009, Springer Berlin Heidelberg, pp. 1-10.

(Continued)

*Primary Examiner* — Sharon M Prange
(74) *Attorney, Agent, or Firm* — Withrow & Terranova, PLLC (57) ABSTRACT

An exoskeleton boot that can be selectively coupled to and decoupled from a lower link of an exoskeleton includes an upper configured to receive a foot of a human user and an outsole coupled to the upper. An exoskeleton connection interface is structurally coupled to the outsole and has a locked mode and an unlocked mode. In the locked mode, the exoskeleton connection interface is configured to inhibit decoupling from a boot connection interface of an exoskeleton link. In the unlocked mode, the exoskeleton connection interface is configured to facilitate decoupling from the boot connection interface.

19 Claims, 7 Drawing Sheets

(51) Int. Cl.
  *B25J 9/00* (2006.01)
  *A43B 7/14* (2006.01)
(58) Field of Classification Search
  USPC .................................................. 36/132, 136
  See application file for complete search history.

(56) References Cited

U.S. PATENT DOCUMENTS

| | | | |
|---|---|---|---|
| 3,964,182 A | 6/1976 | Pomeret et al. | |
| 4,258,556 A | 3/1981 | Ruyten et al. | |
| 5,016,869 A | 5/1991 | Dick et al. | |
| 5,020,790 A | 6/1991 | Beard et al. | |
| 5,054,476 A | 10/1991 | Petrofsky et al. | |
| 5,471,405 A * | 11/1995 | Marsh | A43B 3/0005 702/41 |
| 5,476,441 A | 12/1995 | Durfee et al. | |
| 5,865,426 A | 2/1999 | Kazerooni | |
| 5,954,677 A | 9/1999 | Albrecht et al. | |
| 5,993,404 A | 11/1999 | McNiel | |
| 6,039,707 A | 3/2000 | Crawford et al. | |
| 6,886,812 B2 | 5/2005 | Kazerooni | |
| 6,913,583 B2 | 7/2005 | Jestrabek-Hart | |
| 7,153,242 B2 | 12/2006 | Goffer | |
| 7,163,518 B1 | 1/2007 | Roche et al. | |
| 7,571,839 B2 | 8/2009 | Chu et al. | |
| 7,628,766 B1 | 12/2009 | Kazerooni et al. | |
| 7,883,546 B2 | 2/2011 | Kazerooni et al. | |
| 7,947,004 B2 | 5/2011 | Kazerooni et al. | |
| 8,057,410 B2 | 11/2011 | Angold et al. | |
| 8,060,945 B2 | 11/2011 | Adarraga | |
| 8,070,700 B2 | 12/2011 | Kazerooni et al. | |
| 8,171,570 B2 | 5/2012 | Adarraga | |
| 8,231,688 B2 | 7/2012 | Fairbanks et al. | |
| 8,257,291 B2 | 9/2012 | Kazerooni et al. | |
| 8,307,572 B2 * | 11/2012 | Foxen | A43B 3/0047 36/131 |
| 8,394,038 B2 | 3/2013 | Ashihara et al. | |
| 8,672,865 B2 * | 3/2014 | Franke | A61F 5/0111 36/117.5 |
| 8,702,632 B2 | 4/2014 | Han et al. | |
| 8,801,641 B2 | 8/2014 | Kazerooni et al. | |
| 8,894,592 B2 | 11/2014 | Amundson et al. | |
| 8,945,028 B2 | 2/2015 | Kazerooni et al. | |
| 8,968,222 B2 | 3/2015 | Kazerooni et al. | |
| 9,011,354 B2 | 4/2015 | Angold et al. | |
| 9,333,644 B2 | 5/2016 | Angold | |
| 9,492,300 B2 | 11/2016 | Bujold et al. | |
| 9,662,262 B2 | 5/2017 | Hollander et al. | |
| 2003/0062241 A1 | 4/2003 | Irby et al. | |
| 2003/0073552 A1 | 4/2003 | Knight | |
| 2003/0093018 A1 | 5/2003 | Albrecht et al. | |
| 2003/0109817 A1 | 6/2003 | Berl | |
| 2003/0115954 A1 | 6/2003 | Zemlyakov et al. | |
| 2004/0106881 A1 | 6/2004 | McBean et al. | |
| 2004/0237351 A1 * | 12/2004 | Howell | A43B 3/0031 36/136 |
| 2005/0137717 A1 | 6/2005 | Gramnas et al. | |
| 2006/0064047 A1 | 3/2006 | Shimada et al. | |
| 2006/0107433 A1 | 5/2006 | Olson | |
| 2006/0260620 A1 | 11/2006 | Kazerooni et al. | |
| 2007/0056592 A1 | 3/2007 | Angold et al. | |
| 2007/0123997 A1 | 5/2007 | Herr et al. | |
| 2007/0233279 A1 | 10/2007 | Kazerooni et al. | |
| 2008/0234608 A1 | 9/2008 | Sankai | |
| 2009/0210093 A1 | 8/2009 | Jacobsen et al. | |
| 2009/0292369 A1 | 11/2009 | Kazerooni et al. | |
| 2010/0076360 A1 | 3/2010 | Shimada et al. | |
| 2010/0094185 A1 | 4/2010 | Amundson et al. | |
| 2010/0152630 A1 | 6/2010 | Matsuoka et al. | |
| 2010/0210980 A1 * | 8/2010 | Kudoh | A61H 3/008 601/34 |
| 2010/0254696 A1 | 10/2010 | McKay | |
| 2010/0324699 A1 | 12/2010 | Herr et al. | |
| 2011/0040216 A1 | 2/2011 | Herr et al. | |
| 2011/0105966 A1 | 5/2011 | Kazerooni et al. | |
| 2011/0166489 A1 | 7/2011 | Angold et al. | |
| 2011/0201978 A1 | 8/2011 | Jeon et al. | |
| 2011/0214524 A1 | 9/2011 | Jacobsen et al. | |
| 2011/0264014 A1 | 10/2011 | Angold | |
| 2011/0266323 A1 | 11/2011 | Kazerooni et al. | |
| 2012/0004736 A1 | 1/2012 | Goldfarb et al. | |
| 2012/0073165 A1 * | 3/2012 | McKeown | A43B 3/0005 36/100 |
| 2012/0172770 A1 | 7/2012 | Almesfer et al. | |
| 2012/0192461 A1 * | 8/2012 | Backus | F16B 5/0657 36/136 |
| 2012/0283845 A1 | 11/2012 | Herr et al. | |
| 2012/0292361 A1 * | 11/2012 | Thiruppathi | A45F 3/08 224/576 |
| 2013/0023800 A1 | 1/2013 | Bédard et al. | |
| 2013/0102935 A1 | 4/2013 | Kazerooni et al. | |
| 2013/0150980 A1 | 6/2013 | Swift et al. | |
| 2013/0197408 A1 | 8/2013 | Goldfarb et al. | |
| 2013/0231595 A1 | 9/2013 | Zoss et al. | |
| 2013/0237884 A1 | 9/2013 | Kazerooni et al. | |
| 2013/0296746 A1 | 11/2013 | Herr et al. | |
| 2013/0303950 A1 | 11/2013 | Angold et al. | |
| 2013/0331744 A1 | 12/2013 | Kamon | |
| 2014/0001222 A1 | 1/2014 | Vierthaler et al. | |
| 2014/0046234 A1 | 2/2014 | DeSousa | |
| 2014/0094729 A1 | 4/2014 | Lachance et al. | |
| 2014/0200491 A1 | 7/2014 | Julin et al. | |
| 2014/0207017 A1 | 7/2014 | Gilmore et al. | |
| 2014/0276264 A1 * | 9/2014 | Caires | A61H 3/00 601/34 |
| 2014/0330431 A1 * | 11/2014 | Hollander | B25J 9/0006 700/245 |
| 2014/0358053 A1 | 12/2014 | Triolo et al. | |
| 2015/0001269 A1 | 1/2015 | Sacksteder | |
| 2015/0057984 A1 | 2/2015 | Nicoletti et al. | |
| 2015/0081036 A1 | 3/2015 | Nakanishi et al. | |
| 2015/0134080 A1 | 5/2015 | Roh | |
| 2015/0173918 A1 | 6/2015 | Herr et al. | |
| 2015/0173992 A1 | 6/2015 | Wang | |
| 2015/0272501 A1 | 10/2015 | Maceachern et al. | |
| 2015/0272809 A1 | 10/2015 | Accoto et al. | |
| 2015/0313786 A1 | 11/2015 | Sano | |
| 2015/0321340 A1 | 11/2015 | Smith | |
| 2015/0366694 A1 | 12/2015 | Bujold et al. | |
| 2016/0015589 A1 | 1/2016 | Lee et al. | |
| 2016/0016307 A1 | 1/2016 | Choi et al. | |
| 2016/0038313 A1 | 2/2016 | Kim et al. | |
| 2016/0038371 A1 | 2/2016 | Sandler et al. | |
| 2016/0058647 A1 | 3/2016 | Maddry | |
| 2016/0067550 A1 * | 3/2016 | Breach | A63B 69/0028 36/103 |
| 2016/0184165 A1 | 6/2016 | Ohta et al. | |
| 2016/0262969 A1 | 9/2016 | Ohta et al. | |
| 2017/0014297 A1 * | 1/2017 | Grygorowicz | B25J 9/0006 |
| 2017/0061828 A1 | 3/2017 | Artemiadis et al. | |
| 2017/0181917 A1 | 6/2017 | Ohta et al. | |
| 2017/0303849 A1 | 10/2017 | De Sapio et al. | |
| 2019/0021883 A1 | 1/2019 | Herr et al. | |

FOREIGN PATENT DOCUMENTS

| | | |
|---|---|---|
| JP | 2003104682 A | 4/2003 |
| JP | 200911818 A | 1/2009 |
| JP | 2018524065 A | 8/2018 |
| JP | 6466420 B2 | 2/2019 |
| KR | 101570679 B1 | 11/2015 |
| WO | 2012154580 A1 | 11/2012 |
| WO | 2013049658 A1 | 4/2013 |
| WO | 2013116900 A1 | 8/2013 |
| WO | 2014125387 A2 | 8/2014 |
| WO | 2014159608 A1 | 10/2014 |
| WO | 2016029159 A2 | 2/2016 |
| WO | 2016162425 A1 | 10/2016 |

(56) References Cited

FOREIGN PATENT DOCUMENTS

| WO | 2017025363 A1 | 2/2017 |
|---|---|---|
| WO | 2017069605 A1 | 4/2017 |

OTHER PUBLICATIONS

Ferris, Daniel P. et al., "An Ankle-Foot Orthosis Powered by Artificial Muscles," Journal of Applied Biomechanics, vol. 21, Issue 2, May 2005, Human Kinetics, Inc., 3 pages.

Ferris, Dan et al., "An Improved Ankle-Foot Orthosis Powered by Artificial Pneumatic Muscles," XIXth Congress of the International Society of Biomechanics: the human body in motion, Jul. 6-11, 2003, Dunedin, New Zealand, University of Otago, 17 pages.

Ferris, Daniel P. et al., "Development of a myoelectrically controlled lower limb orthosis for human locomotion," Proceedings of the NCMRR Symposium "Medical Rehab on the Move: Spotlight on BioEngineering," Abstract, Jan. 4-5, 2001, Bethesda, Maryland, Supported by NIH AR08602 and U.S. Dept. of Veterans Affairs Center Grant #A0806C, 2 pages.

Gordon, Keith E. et al., "Motor Adaptation During Walking with a Powered Ankle Foot Orthosis," Journal of NeuroEngineering and Rehabilitation, vol. 4, 2007, BioMed Central Ltd, 2 pages.

Kawamoto, Hiroaki et al., "Power Assist Method for HAL-3 using EMG-based Feedback Controller," IEEE International Conference on Systems, Man and Cybernetics, Oct. 8, 2003, IEEE, pp. 1648-1653.

Sawicki, Gregory S. et al., "A Knee-Ankle-Foot Orthosis (KAFO) Powered by Artificial Pneumatic Muscles," XIXth Congress of the International Society of Biomechanics: the human body in motion, Jul. 6-11, 2003, Dunedin, New Zealand, 1 page.

Sawicki, Gregory S. et al., "Mechanics and energetics of level walking with powered ankle exoskeletons," The Journal of Experimental Biology, vol. 211, Feb. 19, 2009, The Company of Biologists, pp. 1402-1413.

Non-Final Office Action and Examiner-Initiated Interview Summary for U.S. Appl. No. 14/744,892, dated Feb. 17, 2017, 44 pages.

Notice of Allowance and Notice Requiring Inventor's Oath or Declaration for U.S. Appl. No. 14/744,892, dated Jul. 5, 2017, 11 pages.

Corrected Notice of Allowance for U.S. Appl. No. 14/744,892, dated Jul. 14, 2017, 7 pages.

Notice of Allowance for U.S. Appl. No. 14/801,941, dated Sep. 19, 2018, 8 pages.

Notice of Allowance for U.S. Appl. No. 15/371,709, dated Jul. 13, 2018, 10 pages.

International Search Report and Written Opinion for International Patent Application No. PCT/US2018/032940, dated Sep. 12, 2018, 17 pages.

Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.

Non-Final Office Action for U.S. Appl. No. 13/084,265, dated Sep. 10, 2015, 7 pages.

Extended European Search Report for European Patent Application No. 11766862.4, dated May 27, 2014, 4 pages.

Notice of Reasons for Refusal for Japanese Patent Application No. 2013-504019, dated Feb. 24, 2015, 6 pages.

International Search Report for PCT/US2011/031956, dated Jun. 21, 2011, 2 pages.

International Preliminary Report on Patentability for PCT/US2011/031956, dated Oct. 9, 2012, 6 pages.

Supplemental Notice of Allowability for U.S. Appl. No. 13/084,265, dated Jan. 25, 2016, 3 pages.

Notice of Reasons for Refusal for Japanese Patent Application No. 2013-504019, dated Dec. 22, 2015, 6 pages.

Decision to Grant for Japanese Patent Application No. 2013-504019, dated Aug. 16, 2016, 6 pages.

International Search Report and Written Opinion for International Patent Application No. PCT/US2016/042427, dated Oct. 24, 2016, 18 pages.

Non-Final Office Action for U.S. Appl. No. 15/181,934, dated Mar. 27, 2018, 17 pages.

International Preliminary Report on Patentability for PCT/US2016/042427, dated Jan. 23, 2018, 13 pages.

Non-Final Office Action for U.S. Appl. No. 14/801,941, dated Apr. 25, 2018, 9 pages.

Partial Supplementary European Search Report for European Patent Application No. 16828290.3, dated Mar. 1, 2019, 12 pages.

International Search Report and Written Opinion for International Patent Application No. PCT/US2018/048517, dated Dec. 31, 2018, 13 pages.

Final Office Action for U.S. Appl. No. 15/181,934, dated Oct. 31, 2018, 22 pages.

Advisory Action and AFCP 2.0 Decision for U.S. Appl. No. 15/181,934, dated Jan. 9, 2019, 4 pages.

Non-Final Office Action for U.S. Appl. No. 15/181,934, dated Feb. 26, 2019, 23 pages.

Written Opinion for Singaporean Patent Application No. 11201800019U, dated Mar. 12, 2019, 7 pages.

Non-Final Office Action for U.S. Appl. No. 15/597,213, dated Apr. 30, 2019, 10 pages.

Interview Summary for U.S. Appl. No. 15/181,934, dated Apr. 12, 2019, 11 pages.

Non-Final Office Action for U.S. Appl. No. 14/744,855, dated Apr. 25, 2019, 9 pages.

Author Unknown, "Definition of avoid," Merriam-Webster Dictionary, 2019, accessed online from https://www.merriam-webster.com/dictionary/avoid, Merriam-Webster, Inc., 4 pages.

Notice of Allowance for U.S. Appl. No. 15/597,213, dated Aug. 15, 2019, 7 pages.

Notice of Allowance and Examiner-Initiated Interview Summary for U.S. Appl. No. 15/181,934, dated Jul. 16, 2019, 17 pages.

Final Office Action for U.S. Appl. No. 14/744,855, dated Aug. 13, 2019, 9 pages.

Extended European Search Report for European Patent Application No. 16828290.3, dated Aug. 14, 2019, 11 pages.

Notice of Allowance and AFCP 2.0 Decision for U.S. Appl. No. 14/744,855, dated Oct. 9, 2019, 9 pages.

Extended European Search Report for European Patent Application No. 18801352.8, dated May 28, 2020, 7 pages.

Office Action for Canadian Patent Application No. 3,063,399, dated Feb. 28, 2020, 3 pages.

Notice of Reasons for Refusal for Japanese Patent Application No. 2018-502176, dated Mar. 3, 2020, 10 pages.

International Preliminary Report on Patentability for International Patent Application No. PCT/US2018/048517, dated Mar. 12, 2020, 10 pages.

Examination Report No. 1 for Australian Patent Application No. 2016296482, dated Sep. 21, 2020, 6 pages.

Decision to Grant for Japanese Patent Application No. 2018-502176, dated Sep. 8, 2020, 6 pages.

Non-Final Office Action for U.S. Appl. No. 16/116,048, dated Oct. 29, 2020, 9 pages.

\* cited by examiner

EXOSKELETON BOOT AND LOWER LINK

RELATED APPLICATION

This application claims the benefit of and priority to U.S. Provisional Application No. 62/259,122, filed on Nov. 24, 2015, entitled "EXOSKELETON BOOT AND LOWER LINK," the disclosure of which is hereby incorporated herein by reference in its entirety.

TECHNICAL FIELD

The embodiments relate generally to exoskeleton boots and, in particular, to an exoskeleton boot that can be selectively coupled to and decoupled from a lower link of an exoskeleton.

BACKGROUND

Many conventional exoskeletons are configured to allow a human user wearing the exoskeleton to perform tasks involving heavy loads, particularly loads that are too heavy for the user to interact with without assistance. Many exoskeletons secure a pair of lower links of the exoskeleton to a user's feet via a pair of straps or clasping mechanisms, which encircle a shoe of the user and secure the shoe to a load-bearing member of the exoskeleton. This makes it difficult for the discrete movements of the user's feet to be detected by the exoskeleton, because the user's feet and shoes are not secured to the exoskeleton lower links with sufficient rigidity. In some cases, a slim foot brace is used to connect to the user's foot while the foot is within a shoe, to improve the rigidity of the connection between the user's foot and the lower link of the exoskeleton. However, these mechanisms can result in forcing "flat-footed" steps and reducing the user's ability to "feel the ground," and/or creating pressure points on the user's foot, which can lead to discomfort or injury.

SUMMARY

The embodiments relate generally to exoskeleton boots and, in particular, to an exoskeleton boot that can be selectively coupled to and decoupled from a lower link of an exoskeleton. In one embodiment, an exoskeleton boot includes an upper configured to receive a foot of a human user and an outsole coupled to the upper. An exoskeleton connection interface is structurally coupled to the outsole and has a locked mode and an unlocked mode. In the locked mode, the exoskeleton connection interface is configured to inhibit decoupling from a boot connection interface of an exoskeleton link. In the unlocked mode, the exoskeleton connection interface is configured to facilitate decoupling from the boot connection interface.

One advantage of this arrangement is that an exoskeleton link of an exoskeleton can be detachably coupled directly to an exoskeleton boot being worn by a user, with the boot transferring an exoskeleton load directly through the exoskeleton boot to a support surface. This also allows the user to more easily move and balance when wearing the exoskeleton, because the exoskeleton boot is able to directly support both the user and the exoskeleton without requiring the exoskeleton boot to be fitted to an intermediate support member separating the user's boot from the support surface and the exoskeleton link. Another advantage of this arrangement is that the exoskeleton boot can be worn and used normally in a manner similar to a conventional boot when the exoskeleton boot is decoupled from the exoskeleton.

According to one embodiment, an exoskeleton boot is disclosed. The exoskeleton boot comprises an upper configured to receive a foot of a human user. The exoskeleton boot further comprises an outsole coupled to the upper. The exoskeleton boot further comprises an exoskeleton connection interface structurally coupled to the outsole. The exoskeleton connection interface includes a locked mode wherein the exoskeleton connection interface is configured to inhibit decoupling of the exoskeleton connection interface from a boot connection interface of an exoskeleton link. The exoskeleton connection interface further includes an unlocked mode wherein the exoskeleton connection interface is configured to facilitate decoupling the exoskeleton connection interface from the boot connection interface of the exoskeleton link.

According to another embodiment, a pair of exoskeleton boots is disclosed. The pair of exoskeleton boots comprises a right-side boot. The right-side boot comprises a right-side upper configured to receive a right foot of a human user. The right-side boot further comprises a right-side outsole coupled to the right-side upper. The right-side boot further comprises a right-side exoskeleton connection interface structurally coupled to the right-side outsole. The right-side exoskeleton connection interface includes a locked mode wherein the right-side exoskeleton connection interface is configured to inhibit decoupling of the right-side exoskeleton connection interface from a right-side boot connection interface of a right-side exoskeleton link. The right-side exoskeleton connection interface further comprises an unlocked mode wherein the right-side exoskeleton connection interface is configured to facilitate decoupling the right-side exoskeleton connection interface from the right-side boot connection interface of the right-side exoskeleton link. The pair of exoskeleton boots further comprises a left-side boot. The left-side boot comprises a left-side upper configured to receive a left foot of a human user. The left-side boot further comprises a left-side outsole coupled to the left-side upper. The left-side boot further comprises a left-side exoskeleton connection interface structurally coupled to the left-side outsole. The left-side exoskeleton connection interface includes a locked mode wherein the left-side exoskeleton connection interface is configured to inhibit decoupling of the left-side exoskeleton connection interface from a left-side boot connection interface of a left-side exoskeleton link. The left-side exoskeleton connection interface further includes an unlocked mode wherein the left-side exoskeleton connection interface is configured to facilitate decoupling the left-side exoskeleton connection interface from the left-side boot connection interface of the left-side exoskeleton link.

According to another embodiment, a lower link of an exoskeleton is disclosed. The lower link of the exoskeleton comprises a boot connection interface. The boot connection interface includes a locked mode wherein the boot connection interface is configured to inhibit decoupling the boot connection interface from a rigid connection interface of an exoskeleton boot. The boot connection interface further includes an unlocked mode wherein the boot connection interface is configured to facilitate decoupling the boot connection interface from the rigid connection interface of the exoskeleton boot.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first side" and "second side," and does not imply a priority, a type, an importance, or other attribute, unless otherwise stated herein. As used herein and in the claims, the articles "a" and "an" in reference to an element refers to "one or more" of the element unless otherwise explicitly specified.

The embodiments relate generally to exoskeleton boots and, in particular, to an exoskeleton boot that can be selectively coupled to and decoupled from a lower link of an exoskeleton. In one embodiment, an exoskeleton boot includes an upper configured to receive a foot of a human user and an outsole coupled to the upper. An exoskeleton connection interface is structurally coupled to the outsole and has a locked mode and an unlocked mode. In the locked mode, the exoskeleton connection interface is configured to inhibit decoupling from a boot connection interface of an exoskeleton link. In the unlocked mode, the exoskeleton connection interface is configured to facilitate decoupling from the boot connection interface.

One advantage of this arrangement is that an exoskeleton link of an exoskeleton can be detachably coupled directly to an exoskeleton boot being worn by a user, with the exoskeleton boot transferring an exoskeleton load directly through the exoskeleton boot to a support surface. This also allows the user to more easily move and balance when wearing the exoskeleton, because the exoskeleton boot is able to directly support both the user and the exoskeleton without requiring the exoskeleton boot to be fitted to an intermediate support member separating the user's boot from the support surface and the exoskeleton link. Another advantage of this arrangement is that the exoskeleton boot can be worn and used normally in a manner similar to a conventional boot when the exoskeleton boot is decoupled from the exoskeleton.

The phrase "upper" is used herein to refer to the part of a boot that encloses a user's foot other than the bottom of the user's foot. The phrase "outsole" is used herein to refer to the part of a boot that sits below a user's foot. The upper and sole together completely enclose the user's foot. The phrase "heel" is used herein to refer to the part of the outsole that raises the rear of the boot in relation to the front. The phrase "quarter" is used herein to refer to the rear and sides of the upper that encloses the heel of the user.

Figure 1:
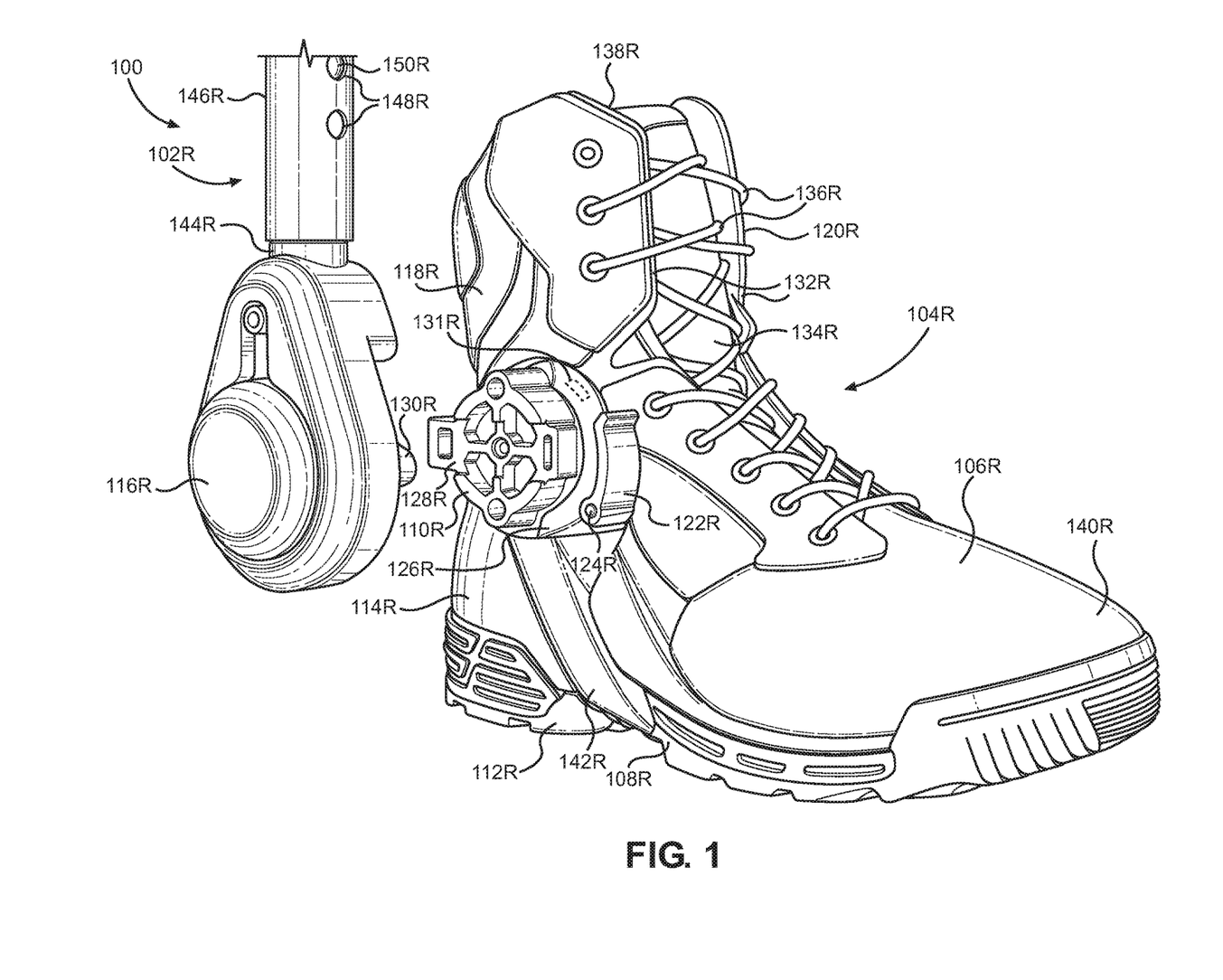
FIG. 1 is a perspective view of a right-side exoskeleton boot and a portion of a right-side exoskeleton lower link configured to be removably coupled to the right-side exoskeleton boot, according to an embodiment.

Referring now to FIG. 1, an exoskeleton 100 includes a right-side exoskeleton link 102R and a right-side exoskeleton boot 104R configured to be detachably coupled to the right-side exoskeleton link 102R. It should be understood that elements having a reference number with an "R" suffix generally refer to a right-side element of a matched pair of elements. In general, a right-side element has a matching left-side element, which is generally denoted by an "L" suffix. For example, the right-side exoskeleton boot 104R in this embodiment forms a matched pair with a left-side exoskeleton boot 104L, which will be described below with respect to FIG. 2.

Referring back to the right-side exoskeleton boot 104R of FIG. 1, the right-side exoskeleton boot 104R comprises a right-side upper 106R configured to receive a foot of a human user (see FIG. 3) and a right-side outsole 108R coupled to the right-side upper 106R. In this example, the right-side upper 106R may comprise flexible materials, such as synthetic or leather materials, for comfort and strength, and the right-side outsole 108R may be made of a durable synthetic material that can support a load, and has relatively high wearability. A right-side exoskeleton connection interface 110R is structurally coupled to the right-side outsole 108R.

In this embodiment, the right-side outsole 108R includes a right-side rigid heel 112R configured to support a weight associated with the exoskeleton 100 and/or the human user. In this example, a right-side rigid quarter 114R is fixedly coupled to the right-side rigid heel 112R, and extends along a rear perimeter of the rigid heel 112R to enclose a heel of the human user and to provide a rigid support structure for the right-side exoskeleton connection interface 110R. In this regard, the right-side exoskeleton connection interface 110R is fixedly coupled to the right-side rigid quarter 114R, such that the right-side outsole 108R is configured to support the weight associated with the exoskeleton 100 and/or the human user applied through the right-side exoskeleton connection interface 110R, through the right-side rigid quarter 114R and right-side rigid heel 112R and transferred to a support surface. In this example, the weight associated with the exoskeleton 100 and/or the human user is at least 200 pounds, but it should be understood that the components of the right-side exoskeleton boot 104R may be configured to support larger or smaller weights, as desired. The right-side exoskeleton connection interface 110R and other components of the exoskeleton 100 may comprise a suitably rigid material, such as plastic, metal, or the like.

The right-side exoskeleton connection interface 110R is configured to be removably coupled to a right-side boot connection interface 116R of the right-side exoskeleton link 102R. In this embodiment as well, the right-side exoskeleton connection interface 110R has a locked mode and an unlocked mode. As will be described in greater detail with respect to FIG. 6, in the locked mode, the right-side exoskeleton connection interface 110R is configured to inhibit decoupling from the right-side boot connection interface 116R of the right-side exoskeleton link 102R. In the unlocked mode, the right-side exoskeleton connection interface 110R is configured to facilitate decoupling from the right-side boot connection interface 116R.

In this embodiment, the right-side exoskeleton boot 104R has a right-side outer side 118R corresponding to an outer-facing side of the human user's right foot, and a right-side inner side 120R corresponding to an inner-facing side of the user's right foot, adjacent to an inner-facing side of the human user's left foot. The right-side exoskeleton connection interface 110R is mounted on the right-side outer side 118R, but it should be understood that the right-side exoskeleton connection interface 110R can be mounted elsewhere with respect to the right-side exoskeleton boot 104R, as desired.

The right-side exoskeleton connection interface 110R has a lock mechanism, which is a right-side lock lever 122R in this example, rotatable about a right-side hinge 124R with respect to a right-side connection interface body 126R. In FIG. 1, the right-side lock lever 122R is in a locked configuration corresponding to the locked mode, which causes a right-side exoskeleton engagement mechanism 128R of the right-side connection interface body to attach to a corresponding right-side boot engagement mechanism 130R of the right-side boot connection interface 116R, thereby inhibiting decoupling of the right-side exoskeleton connection interface 110R from the right-side boot connection interface 116R of the right-side exoskeleton link 102R. The right-side lock lever 122R can also be rotated to an unlocked configuration corresponding to the unlocked mode, which causes a right-side exoskeleton engagement mechanism 128R of the right-side connection interface body 126R to detach from the right-side boot engagement mechanism 130R, thereby facilitating decoupling of the right-side exoskeleton connection interface 110R from the right-side boot connection interface 116R.

The right-side exoskeleton connection interface 110R and the right-side boot connection interface 116R are located at a position corresponding to an outer ankle of the human user to permit the right-side exoskeleton boot 104R to selectively rotate with respect to the right-side exoskeleton link 102R.

For example, in this embodiment, the right-side exoskeleton connection interface 110R is fixed with respect to the right-side rigid quarter 114R while the right-side boot connection interface 116R comprises an actuator (not shown), such as a motor, to actuate rotation of the right-side exoskeleton boot 104R and to provide resistance against rotation of the right-side exoskeleton boot 104R, as desired. In another embodiment, the right-side exoskeleton connection interface 110R and/or right-side boot connection interface 116R may allow free rotation of the right-side exoskeleton boot 104R and/or may provide a degree of resistance against rotation, e.g., by a torsion spring (not shown). The right-side exoskeleton boot 104R may also include one or more right-side sensors 131R to facilitate a determination of a load on the right-side exoskeleton boot 104R. The right-side sensors 131R may include pressure sensors, gyro sensors, and/or other various electronics to determine, for example, a current orientation of the right-side exoskeleton boot 104R. Components of the right-side exoskeleton boot 104R and/or other components of the exoskeleton 100 may be in communication with the right-side sensors 131R and may be configured to be operated in response to signals received from the right-side sensors 131R. For example, a signal generated by the right-side sensors 131R based on a force applied to the right-side exoskeleton boot 104R may be used by a controller (not shown) to facilitate movement of the right-side exoskeleton boot 104R or another component. As noted above, additional features and details of the right-side exoskeleton connection interface 110R are described in greater detail with respect to FIG. 6 below.

Referring back to the right-side exoskeleton boot 104R of FIG. 1, the right-side upper 106R may include a number of conventional features, such as a right-side throat opening 132R and a right-side tongue 134R. The right-side throat opening 132R has a number of right-side eyelets for receiving a right-side shoelace 136R. The right-side upper 106R forms a right-side interior insole 138R that can be secured to the human user's right foot by tightening and tying the right-side shoelace 136R, as is known in the art. The right-side upper 106 also includes a right-side toe portion 140R to protect the human user's foot. The right-side outsole 108R may also include a right-side shank 142R that extends from a midsection of the outsole to the right-side exoskeleton connection interface 110R. The right-side shank 142R may be coupled to the right-side rigid quarter to provide reinforcement against bending or twisting of the right-side rigid quarter 114R, thereby adding rigidity to the right-side outsole 108R, the right-side rigid heel 112R, and the right-side rigid quarter 114R, which in turn allows the right-side exoskeleton boot 104R to bear larger loads while protecting the human user's foot from unnecessary stress and potential injury.

As will be discussed in greater detail with respect to FIGS. 3 and 4, the right-side exoskeleton link 102R is telescopically adjustable to accommodate different human users. In this regard, the right-side exoskeleton link 102R comprises a right-side exoskeleton extension member 144R coupled to the right-side exoskeleton connection interface 110R. The right-side exoskeleton extension member 144R is telescopically connected to a right-side telescoping tube 146R, which permits the right-side exoskeleton link 102R to be adjusted to different lengths based on a calf length of a human user. The right-side telescoping tube 146R has a plurality of right-side locking apertures 148R configured to receive a right-side biased protrusion 150R to selectively secure the right-side exoskeleton extension member 144R with respect to the right-side telescoping tube 146R at one of a plurality of predetermined positions, as is known in the art. In this manner, the right-side exoskeleton link 102R can be secured at one of a plurality of predetermined lengths.

Figure 2:
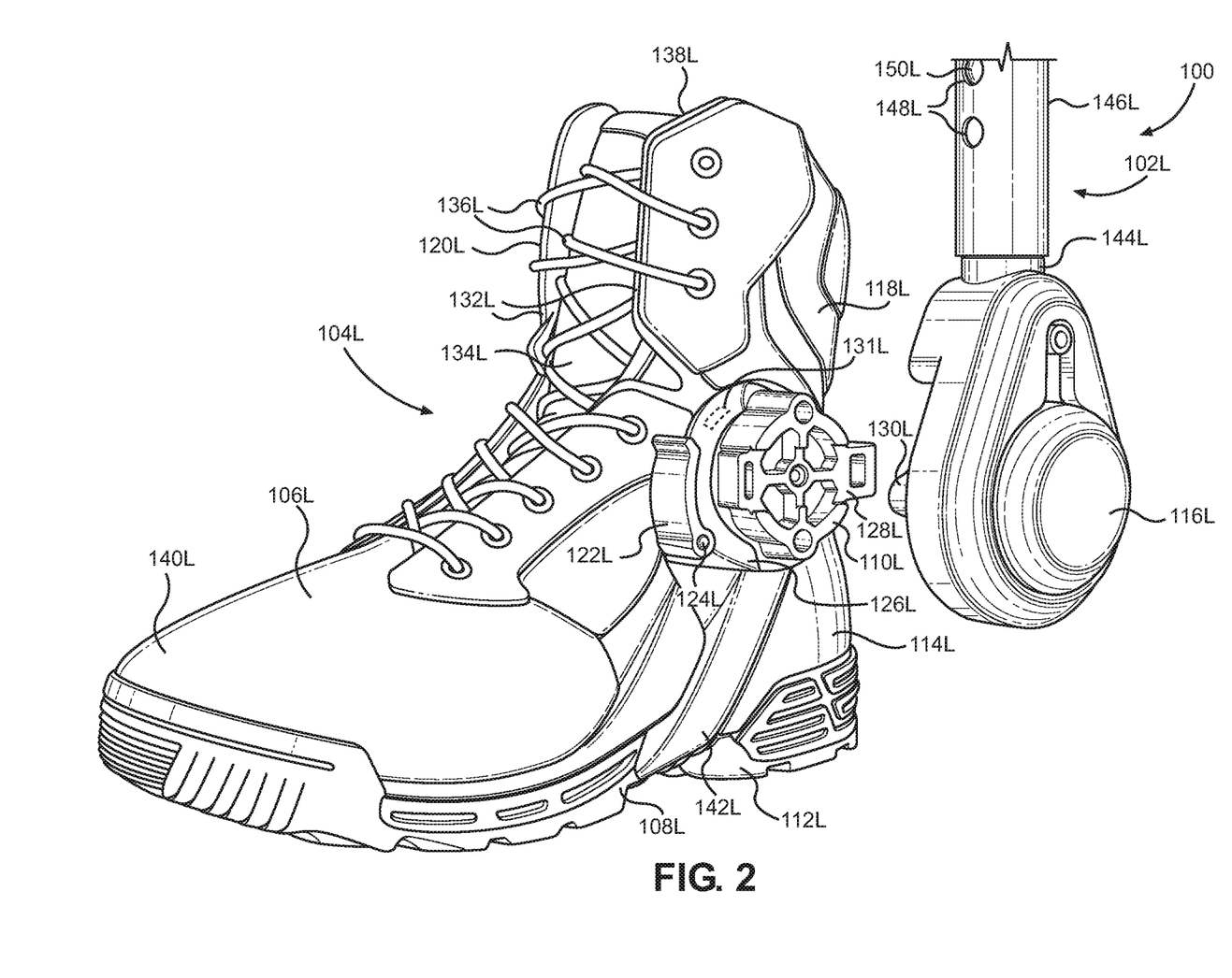
FIG. 2 is a perspective view of a left-side exoskeleton boot corresponding to the right-side exoskeleton boot of FIG. 1 and a portion of a left-side exoskeleton lower link corresponding to the right-side exoskeleton lower link of FIG. 1, according to an embodiment.

As noted above, the right-side exoskeleton boot 104R of this embodiment has a corresponding left-side exoskeleton boot 104L. In this regard, FIG. 2 illustrates the left-side exoskeleton boot 104L and a portion of a corresponding left-side exoskeleton link 102L. In this embodiment, the left-side components of the left-side exoskeleton boot 104L is a mirror-image of the corresponding right-side components of the right-side exoskeleton boot 104R of FIG. 1. For example, the right-side lock lever 122R is located forward of a left-side exoskeleton connection interface 110L on the right-side outer side 118R of the right-side exoskeleton boot 104R and configured to be rotated clockwise from the locked configuration to the unlocked configuration. Meanwhile, a left-side lock lever 122L is also located forward of the left-side exoskeleton connection interface 110L on a left-side outer side 118L of the left-side exoskeleton boot 104L. As such, the left-side lock lever 122L is configured to be rotated counter-clockwise from the locked configuration to the unlocked configuration.

In an alternative embodiment, the right-side exoskeleton connection interface 110R and the left-side exoskeleton connection interface 110L could be identical, with the right-side lock lever 122R located forward of the right-side exoskeleton connection interface 110R on the right-side outer side 118R of the right-side exoskeleton boot 104R, and the left-side lock lever 122L located rearward of the left-side exoskeleton connection interface 110L on the left-side outer side 118L of the left-side exoskeleton boot 104L. In this embodiment, both the right-side lock lever 122R and the left-side lock lever 122L would be configured to rotate clockwise from the locked configuration to the unlocked configuration. This visually asymmetrical arrangement would allow some or all of the same components to be used for both the right-side exoskeleton connection interface 110R and the left-side exoskeleton connection interface 110L, which has the benefit of reducing costs.

Figure 3:
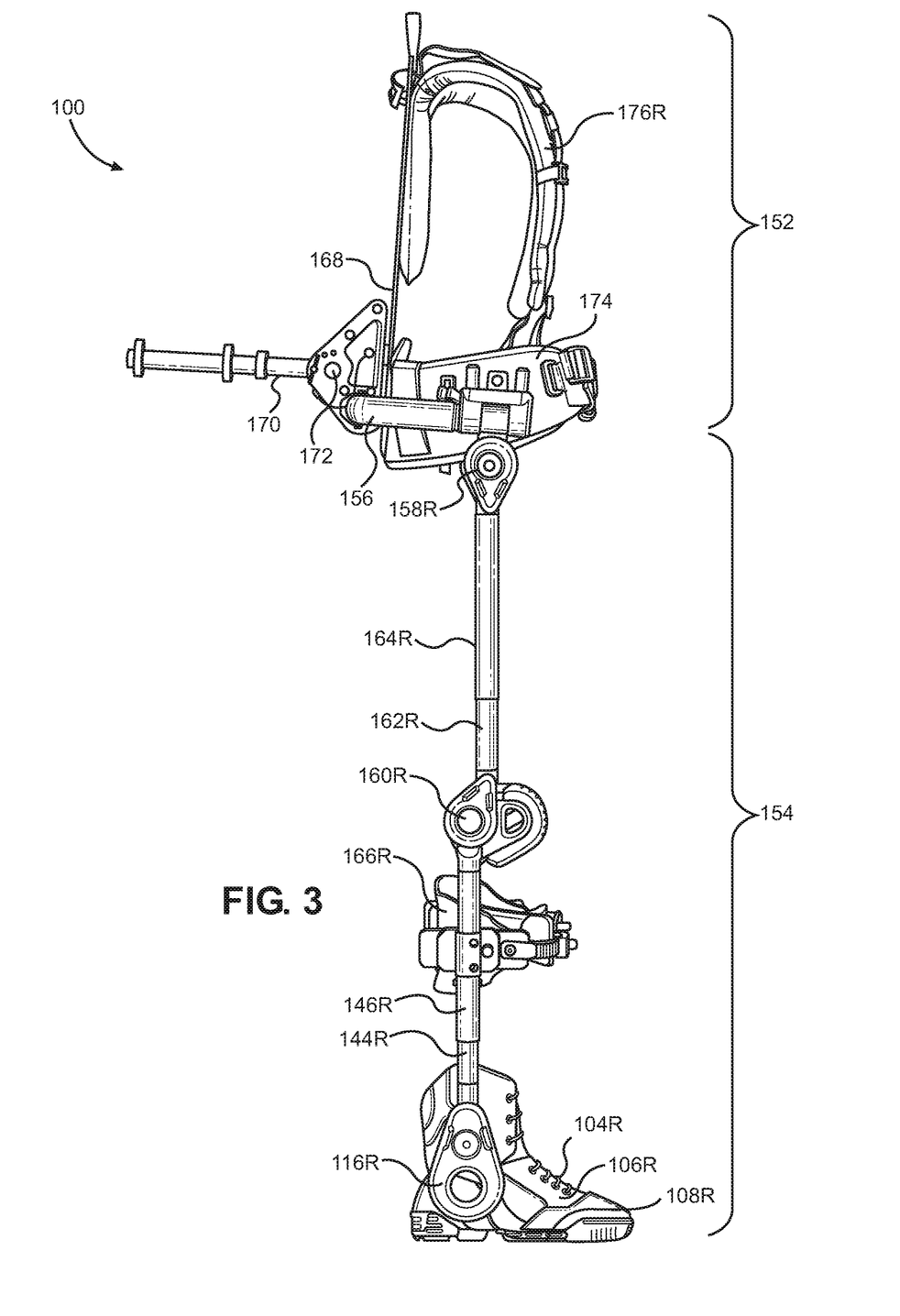
FIG. 3 illustrates a side view of an exoskeleton containing a pair of exoskeleton lower links configured to be removably coupled to the pair of exoskeleton boots of FIGS. 1 and 2, according to an embodiment.

Turning now to FIG. 3, a side view of the exoskeleton 100 of FIGS. 1 and 2 is illustrated. In this embodiment, the exoskeleton 100 is a full-body exoskeleton including an upper body exoskeleton 152 and a lower body exoskeleton 154 movably coupled to each other via a hip link 156. It should be understood, however, that embodiments may also include a partial exoskeleton, e.g., the lower body exoskeleton 154 without the upper body exoskeleton 152.

The lower body exoskeleton 154 includes a pair of hip joints 158R, 158L and a pair of knee joints 160R, 160L. A pair of thigh extension members 162R, 162L are rotatably coupled to a corresponding one of the pair of exoskeleton links 102R, 102L (which are lower leg links in this embodiment) via the respective knee joints 160R, 160L. Similar to the exoskeleton links 102R, 102L, each of the thigh extension members 162R, 162L is telescopically adjustable, with each of the thigh extension members 162R, 162L telescopically coupled to a pair of telescoping tubes 164R, 164L, which are in turn rotatably coupled to the hip link 156 via a respective one of the hip joints 158R, 158L. Each of the exoskeleton links 102R, 102L may include one or more lower leg strap mechanisms 166R, 166L for securing the exoskeleton links 102R, 102L to a respective lower leg of a human user. In combination with the selectively removable exoskeleton boots 104R, 104L, this allows the lower body exoskeleton 154 to be secured to the lower body of the human user while allowing the human user to more comfortably and safely use the exoskeleton 100.

The upper body exoskeleton 152 includes a rigid back member 168 and a counterweight assembly 170, which may be rotatably coupled to the rigid back member 168 and/or the hip link 156 via a pivot point 172. The upper body exoskeleton 152 also includes a waist strap mechanism 174 and a pair of shoulder strap mechanisms 176R, 176L for securing the upper body exoskeleton 152 to an upper body (i.e., torso) of a human user.

Figure 4:
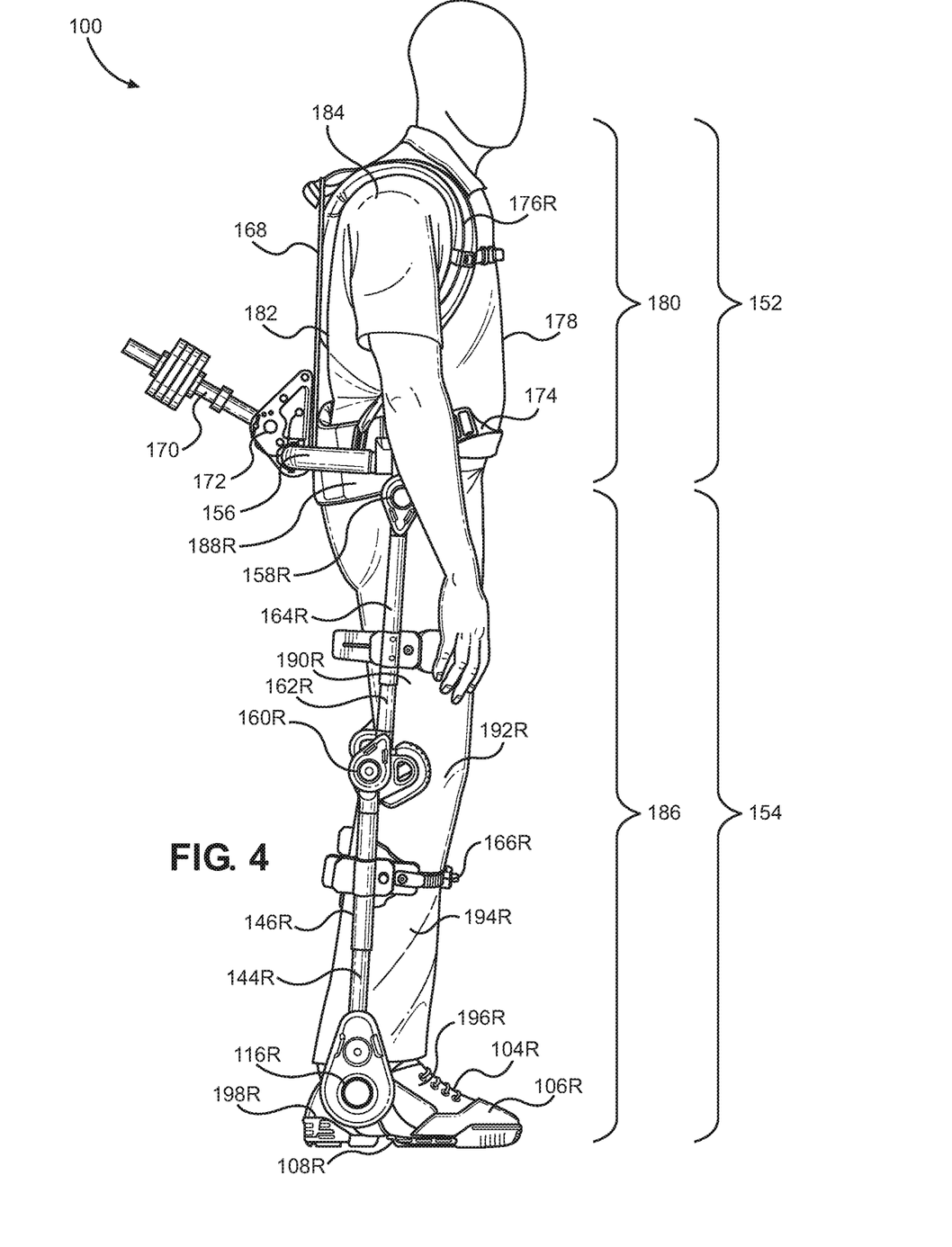
FIG. 4 illustrates a side view of a user wearing the exoskeleton boots of FIGS. 1 and 2 and the exoskeleton of FIG. 3 coupled to the exoskeleton boots, according to an embodiment.

In this regard, FIG. 4 illustrates a human user 178 wearing the exoskeleton 100, including the exoskeleton boots 104R, 104L. In this example, an upper body 180, back 182, and shoulders 184 of the human user 178 are secured to the upper body exoskeleton 152 by the rigid back member 168, the waist strap mechanism 174, and the shoulder strap mechanisms 176R, 176L, and a lower body 186 (i.e., legs) of the human user 178 is secured to the lower body exoskeleton 154. In this example, it can be seen that the exoskeleton 100 is arranged so that the hip joints 158R, 158L correspond to hips 188R, 188L of the human user 178, the thigh extension members 162R, 162L and telescoping tubes 164R, 164L correspond to thighs 190R, 190L of the human user 178, the knee joints 160R, 160L correspond to knees 192R, 192L of the human user 178, and the exoskeleton links 102R, 102L correspond to calves of the human user 178. Feet 196R, 196L of the human user 178 are disposed in the exoskeleton boots 104R, 104L, with the rotatable exoskeleton connection interfaces 110R, 110L corresponding to ankles 198R, 198L of the human user 178.

Figure 5:
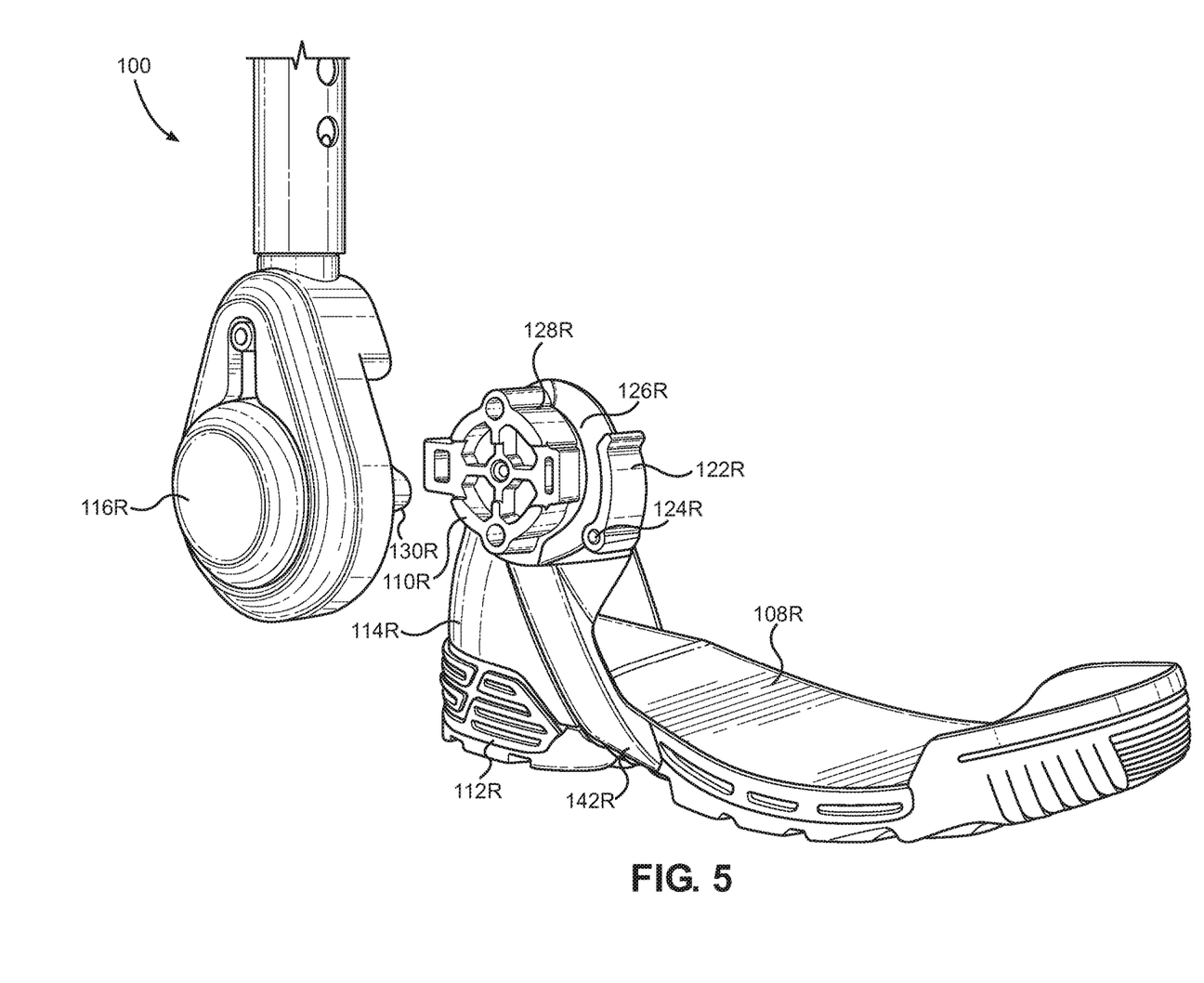
FIG. 5 illustrates a perspective view of the right-side exoskeleton boot of FIG. 1 with a portion of an upper removed to illustrate component parts of the exoskeleton boot.

To better illustrate the load-bearing components of the disclosed exoskeleton boots 104R, 104L, FIG. 5 illustrates a perspective view of the right-side exoskeleton boot 104R of FIG. 1 with a portion of the upper 106R (not shown) removed. As discussed above, the right-side rigid quarter 114R is fixedly coupled to the right-side rigid heel 112R, and the right-side exoskeleton connection interface 110R is fixedly coupled to the right-side rigid quarter 114R. The right-side rigid heel 112R and the right-side rigid quarter 114R may comprise any suitably rigid material, such as metal (e.g., aluminum, steel, etc.), plastic, or the like. In this example, the right-side exoskeleton connection interface 110R is configured to support the weight associated with the exoskeleton 100, which can be 50-75 pounds or more and/or the human user, which can be 150-200 pounds or more. The weight of the exoskeleton 100 and/or the human user is applied through the right-side exoskeleton connection interface 110R to the right-side rigid heel 112R and is transferred through the right-side rigid heel 112R and/or the right-side outsole 108R to a support surface.

Figure 6:
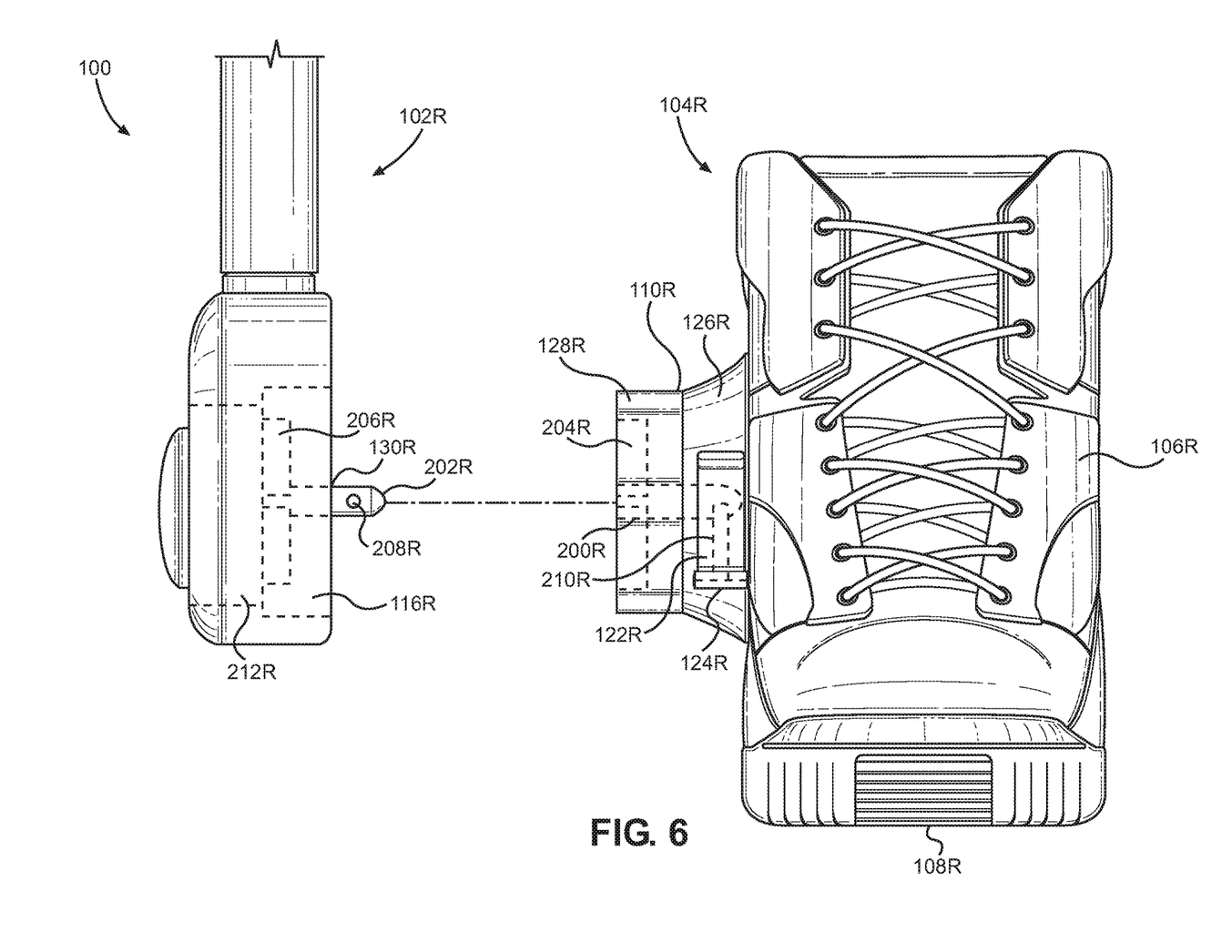
FIG. 6 illustrates a front view of the right-side exoskeleton boot of FIG. 1 showing additional components of an exoskeleton engagement mechanism for removably coupling the exoskeleton boot of FIG. 1 to the exoskeleton lower link, according to an embodiment.

Turning now to FIG. 6, a front view of the right-side exoskeleton boot 104R of FIG. 1 is illustrated, showing additional components of the right-side exoskeleton engagement mechanism 128R. In this regard, the right-side exoskeleton engagement mechanism 128R of the right-side exoskeleton connection interface 110R forms a right-side central aperture 200R for receiving a right-side central protrusion 202R of the right-side boot engagement mechanism 130R of the boot connection interface 116R. In this example, the right-side exoskeleton engagement mechanism 128R also forms a plurality of right-side alignment apertures 204R each configured to receive a corresponding right-side engagement protrusion 206R disposed on the right-side boot engagement mechanism 130R.

The right-side central protrusion 202R forms a transversely extending right-side locking aperture 208R configured to receive a right-side biased locking pin 210R coupled to the right-side lock lever 122R of the right-side exoskeleton connection interface 110R. In this manner, the right-side boot engagement mechanism 130R can be securely coupled to the right-side exoskeleton engagement mechanism 128R. A right-side actuator 212R may also be coupled to the right-side boot engagement mechanism 130R as discussed above.

Figure 7A:
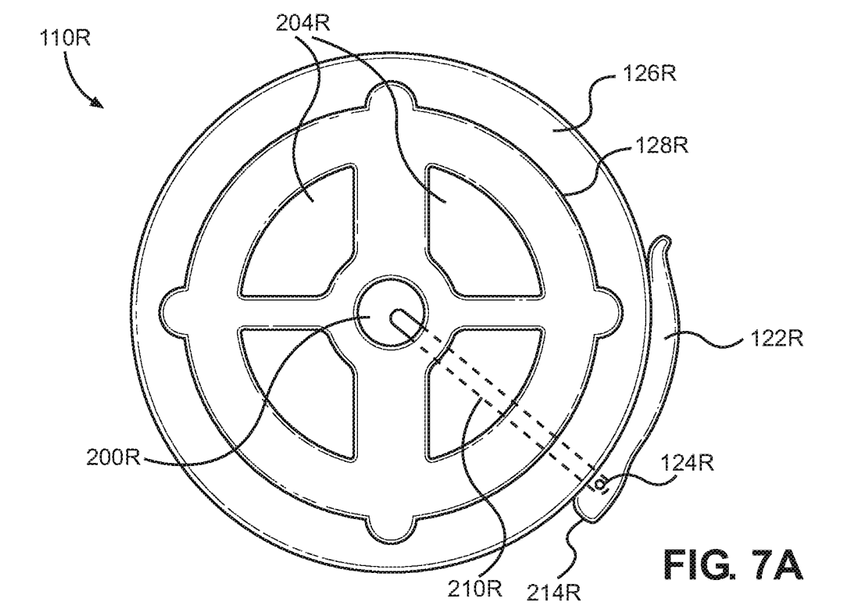
FIGS. 7A and 7B illustrate simplified schematic views of the exoskeleton engagement mechanism of FIG. 6 in a locked mode and an unlocked mode, according to an embodiment.
Figure 7B:
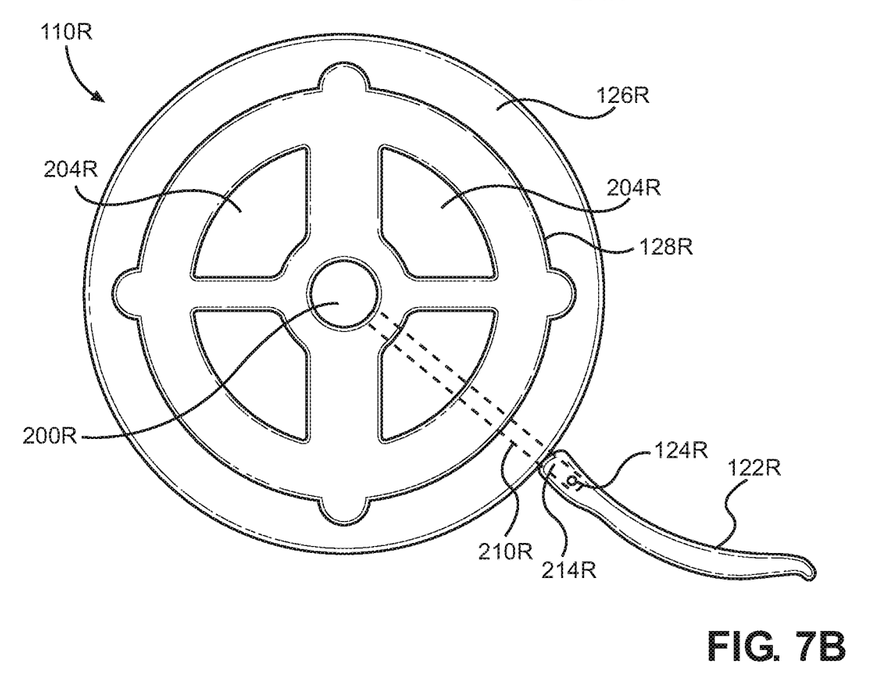

In this manner, the right-side boot engagement mechanism 130R can be removably coupled to the right-side exoskeleton engagement mechanism 128R. In this regard, FIGS. 7A and 7B illustrate simplified schematic views of the right-side exoskeleton engagement mechanism 128R of FIG. 6 in a locked mode and an unlocked mode, according to an embodiment. In FIG. 7A, the right-side lock lever 122R is rotated about the right-side hinge 124R into the locked configuration to bias the right-side biased locking pin 210R into the right-side central aperture 200R. When the boot connection interface 116R is coupled to the right-side exoskeleton engagement mechanism 128R, the right-side biased locking pin 210R extends into the right-side locking aperture 208R of the right-side boot engagement mechanism 130R to inhibit decoupling of the right-side exoskeleton connection interface 110R from the right-side boot connection interface 116R of the exoskeleton 100.

In FIG. 7B, the right-side lock lever 122R is rotated clockwise about the right-side hinge 124R into the unlocked configuration, which causes a right-side standoff stop 214R to pull the right-side biased locking pin 210R out of the right-side central aperture 200R. When the right-side boot engagement mechanism 130R is coupled to the right-side exoskeleton engagement mechanism 128R, rotating the right-side lock lever 122R to the unlocked configuration removes the right-side biased locking pin 210R from the locking aperture of 208R of the right-side boot engagement mechanism 130R to facilitate decoupling of the right-side exoskeleton connection interface 110R from the right-side boot connection interface 116R of the exoskeleton 100.

Those skilled in the art will recognize improvements and modifications to the preferred embodiments of the disclosure. All such improvements and modifications are considered within the scope of the concepts disclosed herein and the claims that follow.

What is claimed is:

1. An exoskeleton boot comprising:
   an upper configured to receive a foot of a human user;
   an outsole coupled to the upper, the outsole and the upper configured to enclose the foot of the human user; and
   an exoskeleton connection interface structurally coupled to the outsole and at a position configured to correspond to an outer ankle of the human user, the exoskeleton connection interface having a locked mode wherein the exoskeleton connection interface is configured to inhibit decoupling of the exoskeleton connection interface from a boot connection interface of an exoskeleton link, and an unlocked mode wherein the exoskeleton connection interface is configured to facilitate decoupling the exoskeleton connection interface from the boot connection interface of the exoskeleton link, the exoskeleton connection interface comprising:
   an aperture configured to receive a protrusion extending from the boot connection interface;
   a lock mechanism configured to move radially to engage the protrusion to, in the locked mode, inhibit axial movement of the protrusion; and
   at least one alignment feature configured to engage the boot connection interface to rotationally fix the exoskeleton connection interface relative to the boot connection interface.

2. The exoskeleton boot of claim 1, wherein the exoskeleton connection interface is configured to support a weight of at least 50 pounds.

3. The exoskeleton boot of claim 1, wherein the exoskeleton connection interface is fixed with respect to the outsole.

4. The exoskeleton boot of claim 1, further comprising a rigid quarter coupled to the outsole, wherein the exoskeleton connection interface is fixedly coupled to the rigid quarter.

5. The exoskeleton boot of claim 4, wherein the rigid quarter is fixed with respect to the outsole.

6. The exoskeleton boot of claim 5, wherein the exoskeleton connection interface is fixed with respect to the rigid quarter.

7. The exoskeleton boot of claim 5, wherein the exoskeleton connection interface is rotatable with respect to the rigid quarter.

8. The exoskeleton boot of claim 1, wherein the lock mechanism has a locked configuration and an unlocked configuration, wherein in the locked configuration the lock mechanism is configured to lock the exoskeleton connection interface to the boot connection interface of the exoskeleton link, and in the unlocked configuration the lock mechanism is configured to unlock the exoskeleton connection interface from the boot connection interface of the exoskeleton link.

9. The exoskeleton boot of claim 1, wherein the exoskeleton connection interface is mounted on a side of the upper.

10. The exoskeleton boot of claim 9, wherein the exoskeleton connection interface is mounted on the upper at a position configured to correspond to the outer ankle of the human user.

11. The exoskeleton boot of claim 1, further comprising a sensor configured to generate a signal based on a force applied to the exoskeleton boot to facilitate movement of the exoskeleton boot based on the signal.

12. The exoskeleton boot of claim 1 wherein the lock mechanism comprises a slidable pin, which is configured to in the locked mode, engage an opening in the protrusion, and in the unlocked mode, does not engage the opening.

13. The exoskeleton boot of claim 1, wherein:
   the upper comprises a throat with a plurality of eyelets for receiving a shoelace;
   the outsole comprises a rigid quarter coupled to a rigid heel to provide a rigid support structure for the exoskeleton connection interface;
   the lock mechanism comprises a lock lever and a locking pin, the lock lever rotatable about a hinge to bias the locking pin into a central aperture in the locked mode;
   the aperture comprises the central aperture and the protrusion comprises a central protrusion; and
   the at least one alignment feature comprises a plurality of alignment apertures proximate the central aperture and configured to receive at least one engagement protrusion of the boot connection interface and align the locking pin with a locking aperture of the central protrusion of the boot connection interface.

14. A pair of exoskeleton boots comprising:
   a right-side boot comprising:
   a right-side upper configured to receive a right foot of a human user;
   a right-side outsole coupled to the right-side upper, the right-side outsole and the right-side upper configured to enclose the right foot of the human user; and
   a right-side exoskeleton connection interface structurally coupled to the right-side outsole and at a position configured to correspond to an outer ankle of the human user, the right-side exoskeleton connection interface having a locked mode, wherein the right-side exoskeleton connection interface is configured to inhibit decoupling of the right-side exoskeleton connection interface from a right-side boot connection interface of a right-side exoskeleton link, and an unlocked mode, wherein the right-side exoskeleton connection interface is configured to facilitate decoupling the right-side exoskeleton connection interface from the right-side boot connection interface of the right-side exoskeleton link, the right-side exoskeleton connection interface comprising:

an aperture configured to receive a protrusion extending from the right-side boot connection interface;
a lock mechanism configured to move radially to engage the protrusion to, in the locked mode, inhibit axial movement of the protrusion; and
at least one alignment feature configured to engage the right-side boot connection interface to rotationally fix the right-side exoskeleton connection interface relative to the right-side boot connection interface; and a left-side boot comprising:
a left-side upper configured to receive a left foot of the human user;
a left-side outsole coupled to the left-side upper, the left-side outsole and the left-side upper configured to enclose the left foot of the human user; and
a left-side exoskeleton connection interface structurally coupled to the left-side outsole and at a position configured to correspond to the outer ankle of the human user, the left-side exoskeleton connection interface having a locked mode, wherein the left-side exoskeleton connection interface is configured to inhibit decoupling of the left-side exoskeleton connection interface from a left-side boot connection interface of a left-side exoskeleton link, and an unlocked mode, wherein the left-side exoskeleton connection interface is configured to facilitate decoupling the left-side exoskeleton connection interface from the left-side boot connection interface of the left-side exoskeleton link, the left-side exoskeleton connection interface comprising:
an aperture configured to receive a protrusion extending from the left-side boot connection interface; and
a lock mechanism configured to move radially to engage the protrusion to, in the locked mode, inhibit axial movement of the protrusion; and
at least one alignment feature configured to engage the left-side boot connection interface to rotationally fix the left-side exoskeleton connection interface relative to the left-side boot connection interface.

15. The pair of exoskeleton boots of claim 14, wherein the right-side exoskeleton connection interface is configured to support a weight of at least 50 pounds and the left-side exoskeleton connection interface is configured to support a weight of at least 50 pounds.

16. The pair of exoskeleton boots of claim 14, wherein the right-side boot comprises a rigid right-side quarter coupled to the right-side outsole, wherein the right-side exoskeleton connection interface is fixedly coupled to the rigid right-side quarter, and
wherein the left-side boot comprises a rigid left-side quarter coupled to the left-side outsole, wherein the left-side exoskeleton connection interface is fixedly coupled to the rigid left-side quarter.

17. The pair of exoskeleton boots of claim 16, wherein the rigid right-side quarter is fixed with respect to the right-side outsole, and wherein the rigid left-side quarter is fixed with respect to the left-side outsole.

18. The pair of exoskeleton boots of claim 14, wherein the right-side exoskeleton connection interface is mounted on a first side of the right-side upper, and wherein the left-side exoskeleton connection interface is mounted on a second side of the left-side upper.

19. The pair of exoskeleton boots of claim 18, wherein the right-side boot further comprises a right-side outer side and a left-side inner side, and the left-side boot further comprises a left-side outer side and a right-side inner side, and wherein the first side of the right-side upper is on the right-side outer side of the right-side boot, and the second side of the left-side upper is on the left-side outer side of the left-side boot.

* * * * *